March 10, 1964   H. W. RAPPUHN   3,124,392
THRUST BEARINGS
Filed Sept. 10, 1962

INVENTOR.
HENRY W. RAPPUHN
BY
Arthur H. Serrell
ATTORNEY

United States Patent Office 3,124,392
Patented Mar. 10, 1964

3,124,392
THRUST BEARINGS
Henry W. Rappuhn, East Norwich, N.Y., assignor to Sperry Rand Corporation, Great Neck, N.Y., a corporation of Delaware
Filed Sept. 10, 1962, Ser. No. 222,505
9 Claims. (Cl. 308—9)

This invention relates to thrust bearings of the type in which a rotating member is radially and axially spaced in relation to a stationary shaft by zones of hydrodynamically pressured gas.

In bearings of the designated type, the radial spacing between the related elements is provided by a gas film having a load supporting zone of positive pressure and a zone of negative pressure. Normally equal axial spacing between the elements is maintained by two gas films having opposed zones of positive pressure at the respective symmetrical ends of the member and two corresponding thrust bearing pads rigidly connected to the stationary shaft in axially spaced relation. The housing for bearings of this character provides a closed receptacle for a suitable compressible gas such as hydrogen that is internally pressurized in the manner stated as the rotating member is accelerated to its designed speed of rotation with respect to the stationary shaft from a standstill condition by suitable rotating means. Gas bearings of the hydrodynamic pressure type operate to provide the described pressurized film zones between the elements in accordance with the principles disclosed in U.S. Letters Patent No. 2,884,282, issued April 28, 1959 to H. Sixsmith without requiring an external pressure source.

Conventional bearings of this character where the thrust bearing pads are rigidly connected to the stationary shaft require a fixed alignment of the pads of precise accuracy in order to obviate seizure of the parts during operation. An object of the present invention is to provide self aligning as well as axially adjustable thrust pads for a pressurized gas bearing to obviate the need of the manufacturing accuracy heretofore required.

A feature of the invention resides in the inclusion in the spacing means provided for the thrust bearing pads of the improved bearing of means for universally mounting the pads in spaced relation on the axis of the stationary shaft.

Another feature of the invention resides in the inclusion of spring means in the provided mounting for biasing the self-aligning bearing pads or thrust plates of the improved bearing in axially spaced condition.

Figure 2:
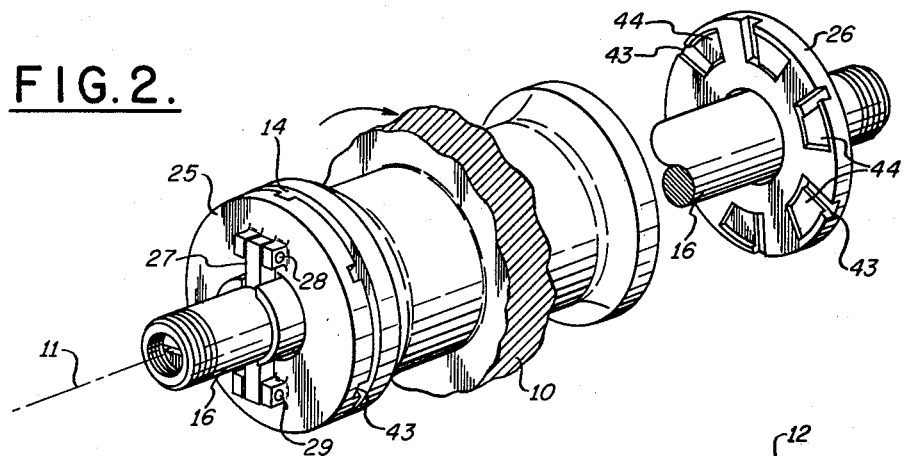
Figure 1:
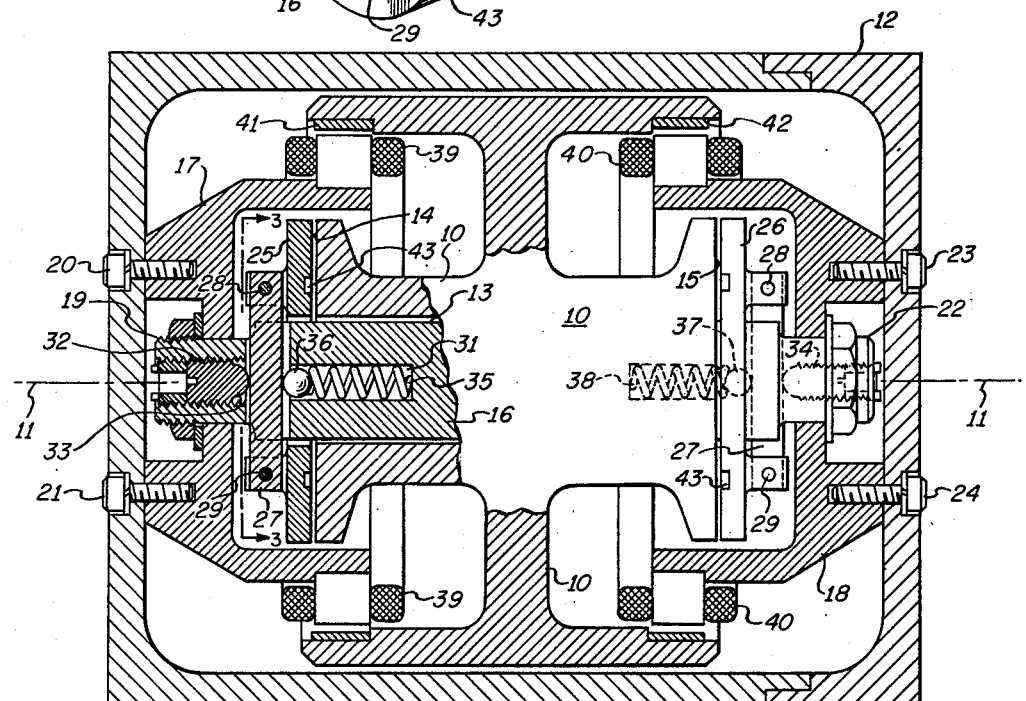
Figure 3:
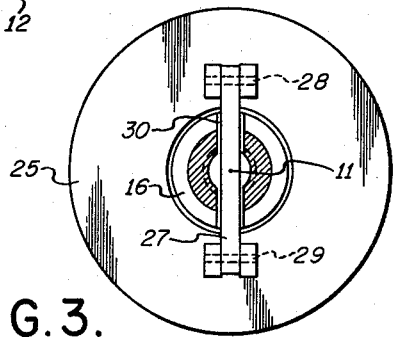

Further objects, features and structural details of the improved thrust bearing will be apparent from the following description when read in relation to the accompanying drawing, wherein, FIG. 1 is a cross sectional view along the axis of an illustrative magnetic memory drum in which the improved thrust bearing is shown, FIG. 2 is a detail perspective view of the relatively movable parts of the improved gas bearing removed from the housing of the drum, and FIG. 3 is a cross sectional view taken on line 3—3, in FIG. 1.

In the illustrative structure shown in FIG. 1, the rotatable member or rotor 10 of the improved gas bearing is arranged to rotate about an axis 11 in a magnetic memory drum housing 12. As shown, the hub of the movable member 10 or journal of the improved bearing includes an axial bore 13 and respective end walls 14 and 15 of corresponding cylindrical symmetry and equal surface area. The relatively fixed part of the improved bearing is shown as an axis providing member or stationary shaft 16 that threads the bore 13 of the rotor 10 and is fixedly attached at its respective ends to the housing 12 through the respective frames 17 and 18. The frame 17 connecting one end of the shaft to the housing includes a suitable screw fastening 19 between the shaft 16 and frame 17 and suitable screw fastenings 20 and 21 between the frame 17 and housing 12. The opposite end of shaft 16 is connected to the housing 12 through the frame 18 by a suitable screw fastening 22 between the shaft 16 and frame 18 and suitable screw fastenings 23 and 24 between the frame 18 and the housing 12. The housing 12 of the illustrated structure includes two interfitting parts that its assembled relation provides a closed receptacle for the gas necessary for the operation of the improved bearing. The movable and stationary members 10 and 16 respectively of the improved structure are contained within the provided receptacle.

The universally mounted thrust bearing pads or plates 25 and 26 of the improved bearing operate in self-aligning relation to space the spinning rotor 10, axially with respect to the shaft 16 with equal axial spacing between the oppositely arranged faces of the pads and the juxtaposed respective end walls 14 and 15 of the rotor 10. As shown, the opposed flat faces of the bearing pads 25 and 26 conform to the configuration of the respective flat end walls 14 and 15 of the rotor 10. In operation, the universally mounted pads 25 and 26 function as a pair to provide the means included in the improved thrust bearing for spacing the moving member 10 in axial relation to the stationary member or shaft 16.

In the arrangement shown in the drawing, the pads or thrust bearing plates 25 and 26 are symmetrical circular discs with an annular opening loosely threading the shaft 16. Each of the paired discs includes a fixed part that bridges its annular opening diametrically in the form of a pin 27 of rectangular cross section that is fixedly connected at its respective ends to the discs by the pin fastenings 28 and 29. The means for universally mounting the pads with respect to the shaft 16 further includes a rectangular aperture or diametral opening in the shaft 16 at its respective ends for each of the pins 27 as indicated at 30 in FIG. 3 for the thrust bearing pad 25. The pins 27 of the respective discs or thrust pads loosely thread the axially spaced rectangular apertures provided in the shaft 16. The mounting structure for the pads further includes axial openings in the respective ends of the shaft 16, the opening provided in the shaft 16 for the pad or disc 25 being indicated at 31 in FIG. 1. The axial spacing provided by the mounting between the thrust pads 25 and 26 is determined by a fitting means for the end openings in the shaft 16 that adjustably engages the outside opposite faces of the bridge parts or pins 27 along the axis 11 of the shaft. The fitting means shown for thrust pad 25 in FIG. 1 is an axially adjustable screw 32 with a rounded end 33 that contacts the outside face of pin 27 at the shaft axis 11. The corresponding adjustable screw 34 of the fitting means for the thrust pad 26 is indicated in dotted lines at the other end of the shaft 16. A further fitting in the end openings in the shaft includes a means for biasing the thrust plates or pads 25, 26 in axially spaced condition by engagement with the inside opposite faces of the bridge parts or pins 27 thereof. This means includes balls for contacting the inside opposite faces of each of the bridging pins 27 and an axial compression spring between the shaft and the respective balls. The compression spring and ball bias structure for the thrust pad 25 are respectively indicated at 35 and 36 in FIG. 1. The duplicate second ball and related spring for the pad 26 included in the improved bearing structure are indicated in dotted lines at 37 and 38 respectively. The described structure provides a means for universally mounting the thrust pads on the axis 11 of the shaft 16 in juxtaposed axially spaced and self-aligning relation to the end walls of the rotating member 10.

The spacing between the pivot points of the mounting is determined by the setting of the adjustable screws 32 and 34. By varying the settings of the screw fastenings 32 and 34 with respect to the shaft 16, the axial spacing between the pair of self-aligning thrust pads 25 and 26 is adjusted as desired.

In bearings of the type described, the pressurization of the gas is dependent on the rotation of the member 10 about the axis 11. As shown in FIG. 1, the rotor 10 is a part of a memory drum and the means provided to bring the drum up to speed as well as maintain it at a designed speed of operation is a pair of electric motors of the hysteresis type having wound stator parts 39 and 40 respectively fixedly connected to the frames 17 and 18 and related ring parts 41 and 42 mounted on the member 10. In operation, the stators of the respective electric motor are energized from a suitable source of alternating current electrical energy and the rotor 10 is accordingly moved about axis 11 in the direction indicated by the arrow in FIG. 2 at its design speed. As represented in FIG. 1, the improved bearing is shown with its respective parts spaced in operative condition and the rotor 10 spinning about axis 11. As a characteristic of the described type of bearing, the rotation of the member 10 provides a hydrodynamically pressurized film of gas that supports the member radially in spaced relation to the shaft 16. Radially of the axis 11, this result is provided by a gas film between the shaft 16 and rotating member 10 with a zone of positive pressure and a zone of negative pressure which separates the parts as the member 10 is brought up to speed from a standstill condition.

In the operation of the improved bearing, axial centering of the member 10 between the faces of the thrust pads is obtained by equalization of the zones of positive pressure between bearing pads 25 and 26 and the respective end walls 14 and 15 of the member 10. The rotating member 10 is accordingly located with relation to the shaft 16 with equal axial spacing between the faces of the respective thrust pads and the end walls of the member 10, with the positive gas pressures in the noted axial spaces in balance, and with the faces of the self-aligning bearing pads aligned in parallel relation normal to the axis 11. Individual zonal areas of axial positive gas pressure may be provided, in the improved bearing by the inclusion therein in the opposed faces of the pads 25 and 26 of a plurality of radial channels 43 and related pressure pockets 44 as shown in FIG. 2. By universally mounting the pads of the improved bearing, the pads operate in self-aligning relation as a pair to maintain the rotating member in centralized condition therebetween.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A thrust bearing of the hydrodynamic gas pressure type comprising a rotatable member having an axial bore and symmetrical end walls, a housing for the member providing a closed receptacle for a gas, a stationary shaft fixed to the housing threading the bore of the member having ends with respective axial and diametral openings, a pair of pads having oppositely arranged thrust faces of the configuration of the end walls of the member with annular openings loosely threading the shaft and respective fixed diametral parts bridging the pad opening and loosely threading the diametral openings in the shaft, means for universally mounting the pads in determined axially spaced relation to the shaft including fittings for the respective axial end openings in the shaft having end parts in engaging relation with the outside opposite faces of the bridging parts of the pads, means fitting the axial end openings in the shaft having parts engaging the inside opposite faces of the bridging parts of the pads along the axis of the shaft for biasing the pads in relation to the shaft in axially spaced condition, and means for rotating the member about its axis with respect to the shaft and pads at a speed providing a hydrodynamically pressurized film of gas that supports the rotating member in radially spaced relation to the shaft and centers the member axially between the faces of the thrust pads with the thrust pads aligned and with equal spacing between the respective pads and member.

2. A thrust bearing of the character claimed in claim 1, in which the end walls of the member are flat, and the pads are symmetrical flat circular discs whose axially spaced thrust faces align in parallel relation normal to the axis of the rotatable member.

3. A thrust bearing of the character claimed in claim 1, in which the bridging parts of the pads are pins of rectangular cross section that are fixedly connected at the respective ends thereof to the pads.

4. A thrust bearing of the character claimed in claim 1, in which the fittings of the spacing and mounting means are axially adjustable screws with rounded ends that contact the outside faces of the bridge parts of the pads along the axis of the shaft.

5. A thrust bearing of the character claimed in claim 1, in which the means for biasing the pads in spaced condition includes axially movable balls contacting the respective inside opposite faces of the bridge parts of the pads, a first axial compression spring between the shaft and one of the balls, and a second axial compression spring between the shaft and the other of the balls.

6. In a thrust bearing of the hydrodynamic gas pressure type, a rotatable member having an axial bore and symmetrical end walls, a receptacle for a gas enclosing the member, a stationary shaft fixed to the receptacle threading the bore of the member having ends with respective axial and diametral openings, a pair of pads having oppositely arranged thrust faces of the configuration of the end walls of the member with annular openings loosely threading the shaft and respective fixed diametral parts bridging the pad opening and loosely threading the diametral openings in the shaft, means fitting the axial end openings in the shaft having parts engaging the outside opposite faces of the bridging parts of the pads for universally mounting the pads in determined axially spaced relation to the shaft, and means fitting the axial end openings on the shaft having parts engaging the inside opposite faces of the bridging parts of the pads for biasing the pads in axially spaced condition in relation to the shaft.

7. A bearing of the character claimed in claim 6 in which the biasing means includes an axial compression spring and a ball for each of the pads.

8. In a thrust bearing of the hydrodynamic gas pressure type, a stationary shaft having an end with respective axial and diametral openings, a thrust pad with an annular opening loosely threading the shaft and a fixed diametral part bridging the pad opening and loosely threading the diametral opening in the shaft, means fitting the axial end opening in the shaft having a part engaging the outside face of the bridging part of the pad for universally mounting the pad in determined axial relation to the shaft, and means fitting the axial end opening in the shaft having a part engaging the inside face of the bridging part of the pad for biasing the pad in its determined axial relation to the shaft.

9. A thrust bearing of the character claimed in claim 8, in which the pad is a flat circular disc, and the diametral bridging part is a pin of rectangular cross section that is fixedly connected at its respective ends to the pad.

References Cited in the file of this patent
UNITED STATES PATENTS

| | | |
|---|---|---|
| 2,588,126 | Kurtz | Mar. 4, 1952 |
| 3,048,043 | Slater | Aug. 7, 1962 |